(12) United States Patent
Farmer et al.

(10) Patent No.: US 9,908,145 B2
(45) Date of Patent: Mar. 6, 2018

(54) EXTRUSION-BASED ADDITIVE MANUFACTURING

(71) Applicant: AIRBUS GROUP LIMITED, London (GB)

(72) Inventors: Benjamin Farmer, Bristol (GB);
William Kessler, Nuremberg (DE);
Jonathan Meyer, Wiltshire (GB);
Andrew Hawkins, Gloucestershire (GB)

(73) Assignee: AIRBUS GROUP LIMITED, London (GB)

( * ) Notice: Subject to any disclaimer, the term of this patent is extended or adjusted under 35 U.S.C. 154(b) by 723 days.

(21) Appl. No.: 14/218,922

(22) Filed: Mar. 18, 2014

(65) Prior Publication Data
US 2014/0287139 A1    Sep. 25, 2014

(30) Foreign Application Priority Data

Mar. 19, 2013 (GB) .................................. 1304968.9

(51) Int. Cl.
*B05D 3/00* (2006.01)
*B29C 64/106* (2017.01)
(Continued)

(52) U.S. Cl.
CPC ............ *B05D 3/002* (2013.01); *B29C 64/106* (2017.08); *B29C 64/393* (2017.08); *B29C 67/0055* (2013.01); *B29C 70/523* (2013.01)

(58) Field of Classification Search
CPC . B29C 67/0055; B29C 70/523; B29C 47/025; B29C 47/06; B29C 47/0004;
(Continued)

(56) References Cited

U.S. PATENT DOCUMENTS 4,680,156 A    7/1987 Collier
5,002,712 A *  3/1991 Goldmann ............ B29B 15/122
                                                        264/136
(Continued)

FOREIGN PATENT DOCUMENTS

DE        44 22 146 A1     1/1996
DE     102011109369 A1     2/2013
(Continued)

OTHER PUBLICATIONS

European Application No. 14159458, Extended Search Report dated Jul. 15, 2014.
(Continued)

*Primary Examiner* — Yogendra N Gupta
*Assistant Examiner* — Emmanuel S Luk
(74) *Attorney, Agent, or Firm* — Hauptman Ham, LLP

(57) ABSTRACT

A method of manufacturing an object. A thermoplastic matrix material is melted to transform it into liquid matrix material. The liquid matrix material is fed into a chamber via one or more matrix inlets. A fiber is also fed into the chamber via a fiber inlet. The fiber in the chamber is contacted by the liquid matrix material. A coated fiber is extruded from an extrusion outlet of the chamber onto a substrate, the coated fiber comprising the fiber with a coating of the liquid matrix material, the substrate comprising a previously extruded coated fiber. The fiber moves in and out of the chamber at the same velocity relative to the chamber. The coating fuses with the previously extruded coated fiber and solidifies after it has fused with the previously extruded coated fiber. Relative movement is generated between the extrusion outlet and the substrate as the coated fiber is extruded from the extrusion outlet.

6 Claims, 7 Drawing Sheets

(51) Int. Cl.
*B29C 64/393* (2017.01)
*B29C 70/52* (2006.01)
*B29C 67/00* (2017.01)

(58) Field of Classification Search
CPC ... B29C 64/393; B29C 64/386; B29C 64/295; B29C 64/336; B29C 64/343; B29C 64/118; B29C 64/171; B29C 64/106
See application file for complete search history.

(56) References Cited

U.S. PATENT DOCUMENTS

| | | | | |
|---|---|---|---|---|
| 5,310,600 | A * | 5/1994 | Tsuya | B29B 9/06 264/136 |
| 5,936,861 | A | 8/1999 | Jang et al. | |
| 9,126,365 | B1 * | 9/2015 | Mark | B29C 70/20 |
| 9,149,988 | B2 * | 10/2015 | Mark | B29C 67/0088 |
| 9,511,543 | B2 * | 12/2016 | Tyler | B29C 67/0055 |
| 2010/0098946 | A1 * | 4/2010 | Tashiro | B29B 9/14 428/371 |
| 2012/0070523 | A1 | 3/2012 | Swanson et al. | |
| 2012/0070619 | A1 * | 3/2012 | Mikulak | B29C 47/0014 428/156 |
| 2012/0231225 | A1 * | 9/2012 | Mikulak | B29C 47/025 428/172 |
| 2013/0337256 | A1 | 12/2013 | Farmer et al. | |
| 2014/0291886 | A1 * | 10/2014 | Mark | B29C 47/004 264/163 |
| 2015/0202646 | A1 * | 7/2015 | Fischer | B05C 5/0241 427/434.6 |
| 2015/0352789 | A1 * | 12/2015 | Haider | B29C 67/0085 264/129 |
| 2016/0082641 | A1 * | 3/2016 | Bogucki | B29C 47/004 427/422 |
| 2016/0082659 | A1 * | 3/2016 | Hickman | C08J 5/005 524/1 |
| 2016/0303802 | A1 * | 10/2016 | Meshorer | B29C 67/0085 |
| 2017/0015059 | A1 * | 1/2017 | Lewicki | B29C 67/0055 |
| 2017/0015060 | A1 * | 1/2017 | Lewicki | B29C 67/0085 |
| 2017/0151728 | A1 * | 6/2017 | Kunc | B29C 67/0096 |

FOREIGN PATENT DOCUMENTS

| | | |
|---|---|---|
| JP | 1-263005 A | 10/1989 |
| JP | 4-197726 A | 7/1992 |
| WO | 2012/037329 A2 | 3/2012 |
| WO | 2012/051513 A2 | 4/2012 |

OTHER PUBLICATIONS

Search Report issued in corresponding GB Application No. 1304968.9 dated Aug. 28, 2013 (4 pages).

* cited by examiner

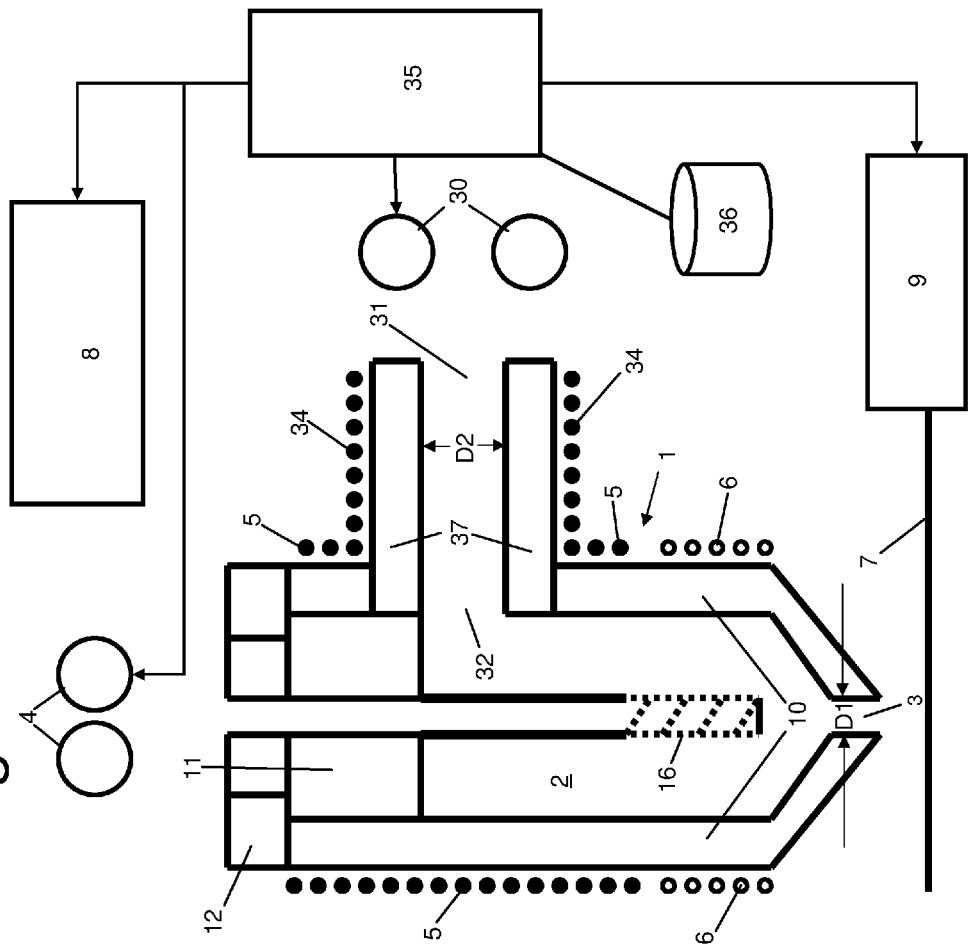

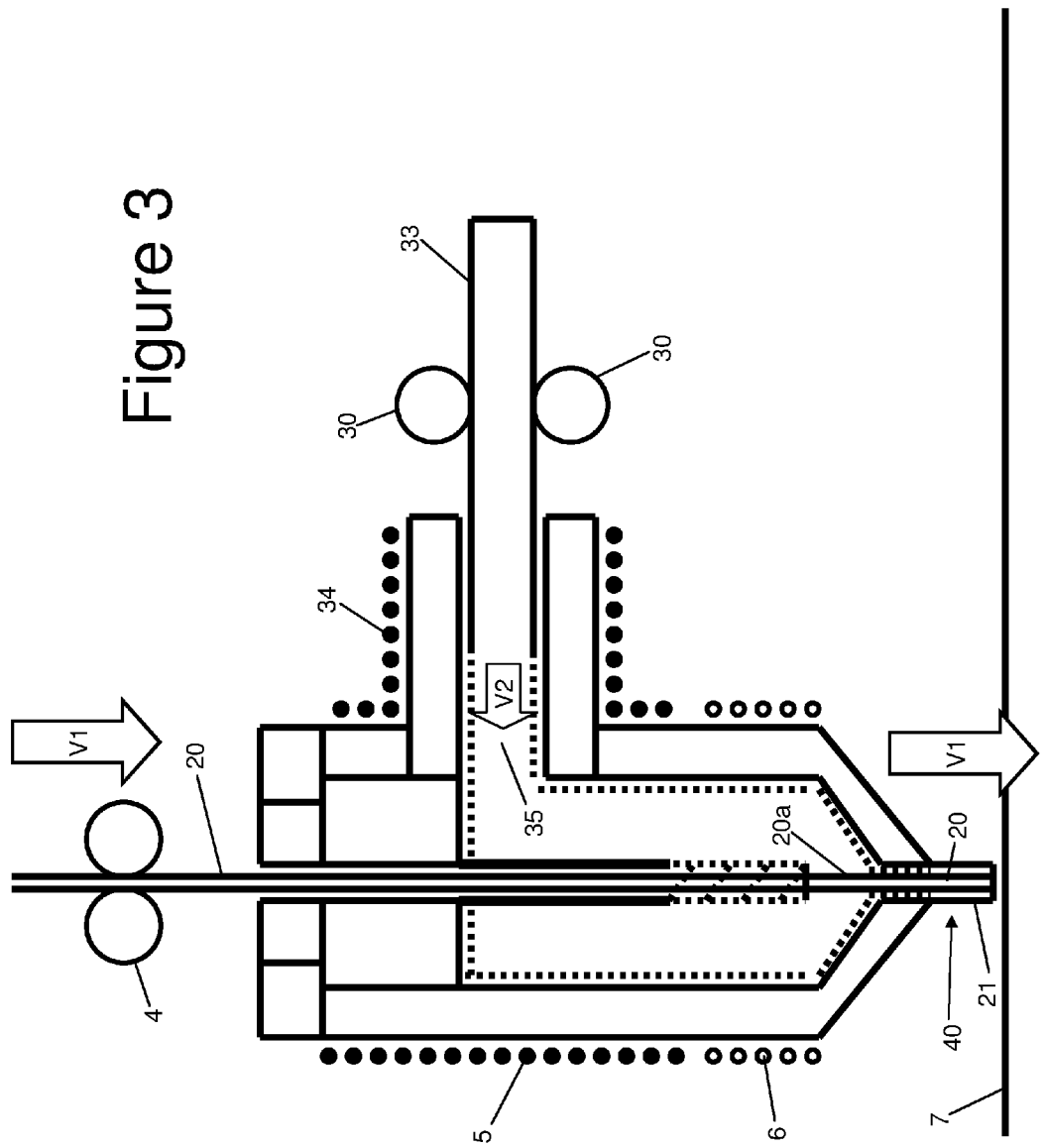

EXTRUSION-BASED ADDITIVE MANUFACTURING

RELATED APPLICATIONS

The present application claims priority to Great Britain Application Number 1304968.9, filed Mar. 19, 2013, the disclosure of which is hereby incorporated by reference herein in its entirety.

FIELD OF THE INVENTION

The present invention relates to an extrusion-based additive manufacturing system, and a method of manufacturing an object by extrusion-based additive manufacturing.

BACKGROUND OF THE INVENTION

An extrusion-based additive manufacturing system is described in WO2012/037329. The system uses a coated fibre as consumable feedstock. The coated fibre has a core portion and a shell portion with different peak crystallization temperatures. Both the core and the shell portions are melted in an extrusion head, and after they have been deposited the portion with the higher crystallization temperature crystallizes before the other portion. This allows the extruded material to resist gravity and the pressure of subsequent layers, while also reducing distortions.

SUMMARY OF THE INVENTION

The present invention provides a method of manufacturing an object, the method comprising: melting thermoplastic matrix material to transform it into liquid matrix material; feeding the liquid matrix material into a chamber via one or more matrix inlets; feeding a fibre into the chamber via a fibre inlet; contacting the fibre in the chamber with the liquid matrix material; extruding a coated fibre from an extrusion outlet of the chamber onto a substrate, the coated fibre comprising the fibre with a coating of the liquid matrix material, the substrate comprising a previously extruded coated fibre, wherein the coating fuses with the previously extruded coated fibre and solidifies after it has fused with the previously extruded coated fibre, and wherein the fibre moves in and out of the chamber at the same velocity relative to the chamber; and causing relative movement between the extrusion outlet and the substrate as the coated fibre is extruded from the extrusion outlet.

The present invention provides the advantage that the rate of flow of the liquid matrix material into the chamber can be controlled independently of the rate of flow of the fibre into the chamber. By way of example this enables the rate of flow of the liquid matrix material into the chamber to be changed in order to increase or decrease the pressure of the liquid matrix material in the chamber. An elevated pressure in the chamber can be beneficial for a number of reasons.

The fibre inlet may comprise an elongate fibre feed channel, which may terminate in a side of the chamber or more preferably extends into the chamber. Similarly the (or each) matrix inlet may comprise an elongate matrix feed channel, and optionally the matrix may be melted within the matrix feed channel.

The fibre typically extends continuously through the chamber from the fibre inlet to the extrusion outlet.

Typically the fibre is pushed through the chamber. The fibre preferably moves simultaneously in and out of the chamber—in other words it is fed into the chamber via the fibre inlet at the same time as it is fed out of the chamber via the extrusion outlet.

The fibre moves in and out of the chamber at the same velocity relative to the chamber. The liquid matrix material, on the other hand, preferably moves out of the chamber at a higher velocity than it moves into the chamber. Typically the liquid matrix material has an average velocity V2 relative to the chamber at the matrix inlet(s) as it flows into the chamber; the coated fibre is extruded at an extrusion velocity V1 relative to the chamber at the extrusion outlet; and V1>V2.

The coated fibre has a cross-sectional area A1 transverse to its length at the extrusion outlet and the fibre has a cross-sectional area F transverse to its length at the fibre inlet. Typically the fibre area F is less than the coated fibre area A1. Each matrix inlet has a matrix inlet area A2, and typically A1−F (in other words the area of the coating of the coated fibre) is less than the matrix inlet area A2 (or the sum of the matrix inlet areas in the case where there are multiple matrix inlets).

Typically the area A1 of the coated fibre is less than the area of the matrix inlet A2 (or the sum of the areas of the matrix inlets in the case where there are multiple matrix inlets).

The object may be manufactured with a single extruded coated fibre only, for instance following a serpentine pattern. However more preferably the object is manufactured with multiple distinct lengths of extruded coated fibres. In such a case each length may be cut mechanically with a cutting blade, but more preferably the method further comprises cutting each length by temporarily raising the temperature in the extrusion chamber above the melting point of the fibre to melt the fibre in the chamber after the coated fibre has been extruded onto the substrate; then after the fibre in the chamber has melted causing relative movement between the extrusion outlet and the substrate to form a break in the fibre; and lowering the temperature in the chamber below the melting point of the fibre. Optionally the extrusion head and the substrate are moved apart (by moving one or both of them) after the fibre is melted in order to assist in forming the break.

The fibre may be formed from a non-polymeric material such as carbon or glass, but more preferably it is formed from a semi-crystalline polymer material.

Optionally the fibre comprise a composite material—for instance a spun fibre drawn from a thermoplastic polymer gel loaded with carbon nanotubes or graphene.

Preferably the fibre is formed from semi-crystalline polymer material with a higher melting point and a higher crystallinity than the matrix material before the matrix material has melted and/or after the matrix material has solidified. By combining high crystallinity with high melting point in the fibre, the coated fibre can be extruded without melting the fibre and destroying its relatively high crystallinity. As a result the fibre can retain attractive properties such as high yield strength in the object.

Typically the fibre is formed from a thermoplastic fibre material. Most preferably the thermoplastic fibre material has a higher melting point than the matrix material before the matrix material has melted and/or after the matrix material has solidified. The melting points can be determined by loss of the crystalline phase determined for instance by differential scanning calorimetry and/or dynamic mechanical thermal analysis. The difference in melting points is preferably less than 15° C. and preferably less than 10° C.

Having the melting points relatively close together in this way is advantageous because it enables the fibre to be "cut" by raising the temperature in the chamber by a small amount.

The difference in melting points is preferably greater than 2° C., and most preferably greater than 5° C. Providing such a minimum difference in the melting points ensures that the fibre is not melted in the extrusion head, unless such melting is required to form a break in the fibre.

The matrix material typically has a melting point (before the matrix material has melted and/or after the matrix material has solidified) which is below 180° C., and preferably below 170° C.

The fibre typically has a melting point which is below 200° C., preferably below 180° C. and most preferably below 170° C.

The fibre and the matrix material may be formed from the same polymer, optionally with different molecular weights. Forming the fibre and the matrix material from the same polymer is preferred because it provides good bonding between them in the coated fibre, and because it tends to give a small difference in melting points between them which is advantageous for the reasons given above.

Typically the fibre comprises a crystalline material with a crystallinity by weight which is greater than 50%, greater than 60%, greater than 70% or greater than 80%. Optionally more than 50%, more than 60%, more than 70% or more than 80% of the fibre by volume comprises crystals aligned within 1° of being parallel with a length of the fibre. The fibre may be formed by drawing a polymer under tension so that a majority of the crystals (and their associated polymer chains) in the fibre are aligned within 1° of being parallel with the length of the fibre.

The matrix material may be completely amorphous but more typically it will have a degree of crystallinity (before the matrix material has melted and/or after the matrix material has solidified). The crystallinity by weight of the matrix material before the matrix material has melted and/or after the matrix material has solidified may be less than 50%, less than 30%, less than 20% by weight or less than 5% by weight.

The difference in average crystallinity by weight between the fibre and the matrix material (before the matrix material has melted and/or after the matrix material has solidified) may be greater than 10%, greater than 30%, greater than 50%, greater than 70% or greater than 90%.

The crystallinity of the fibre and matrix material can be determined by differential scanning calorimetry and/or dynamic mechanical thermal analysis.

The coated fibre preferably has a maximum diameter which is less than 2 mm, or less than 1 mm. Such a small maximum diameter makes the coated fibre suitable for use in an additive manufacturing process.

The coated fibre has an average cross-sectional area which is typically less than 3 mm$^2$ and preferably less than 1 mm$^2$.

Typically the object is manufactured by extruding the coated fibre onto selected parts of the substrate in a series of layers in accordance with a computer-stored three-dimensional model of the object. The object may manufactured by forming a series of non-planar layers, or by forming series of planar layers each comprising a plurality of extruded lengths extending in an X-Y plane formed on selected parts of the substrate in accordance with the three-dimensional model of the object; incrementing the position of the chamber and/or the substrate in a Z-direction orthogonal to the X-Y plane; and repeating the process to form a three-dimensional object comprising a series of layers some of which have different shapes and/or sizes to each other.

A further aspect of the invention provides apparatus for manufacturing an object by an extrusion-based additive manufacturing method, the apparatus comprising: a chamber with one or more matrix inlets, a fibre inlet, and an extrusion outlet; a matrix feed system arranged to feed liquid matrix material into the chamber via the matrix inlet(s); a fibre feed system arranged to feed a fibre into the chamber via the fibre inlet so that the fibre in the chamber is contacted with the liquid matrix material in the chamber and a coated fibre is extruded from the extrusion outlet, wherein the fibre feed system is arranged to feed the fibre into the chamber so that it moves in and out of the chamber at the same velocity relative to the chamber; a build plate; a drive system arranged to cause relative movement between the extrusion outlet and the build plate; and a controller programmed to operate the feed systems and the drive system in order to manufacture an object on the build plate by extrusion-based additive manufacturing.

Optionally the apparatus further comprises a tube which extends from the fibre inlet into the chamber, the tube having a distal end inside the chamber which is formed with a tube outlet, and a plurality of openings distributed along its length which enable the liquid matrix material in the chamber to contact the fibre in the tube. The tube may be circular in cross-section or any other shape.

Typically the extrusion outlet has an extrusion outlet area, the fibre inlet has a fibre inlet area, and the extrusion outlet area is greater than the fibre inlet area.

Typically the extrusion outlet has an extrusion outlet area, and the fibre feed system has a feed channel (for instance between a pair of feed rollers) with a feed channel area which is less than the extrusion outlet area. Typically each matrix inlet has a matrix inlet area, and a difference between the extrusion outlet area and the feed channel area is less than the matrix inlet area (or a sum of the matrix inlet areas in the case where there are multiple matrix inlets).

Optionally the apparatus further comprises a chamber heater for heating the chamber.

Optionally the apparatus further comprises a matrix heater for melting the matrix material before it is fed into the chamber.

Optionally the apparatus further comprises a fibre heater for temporarily raising the temperature in the extrusion chamber above the melting point of the fibre to melt the fibre in the chamber. Typically the controller is programmed to operate the fibre heater to temporarily raise the temperature in the extrusion chamber above the melting point of the fibre to melt the fibre in the chamber. Where such a fibre heater is provided, then typically the controller is programmed to operate it independently of the other heater(s).

Typically the fibre feed system comprises two or more motorized fibre drive rollers.

BRIEF DESCRIPTION OF THE DRAWINGS

Embodiments of the invention will now be described with reference to the accompanying drawings, in which:

FIG. 1 is a schematic view of apparatus for manufacturing an object by an extrusion-based additive manufacturing method;

FIG. 2 shows a disassembled part of the extrusion head;

FIG. 3 shows the apparatus of FIG. 1 extruding a coated fibre towards the build plate;

DETAILED DESCRIPTION OF EMBODIMENT(S)

Figure 4:
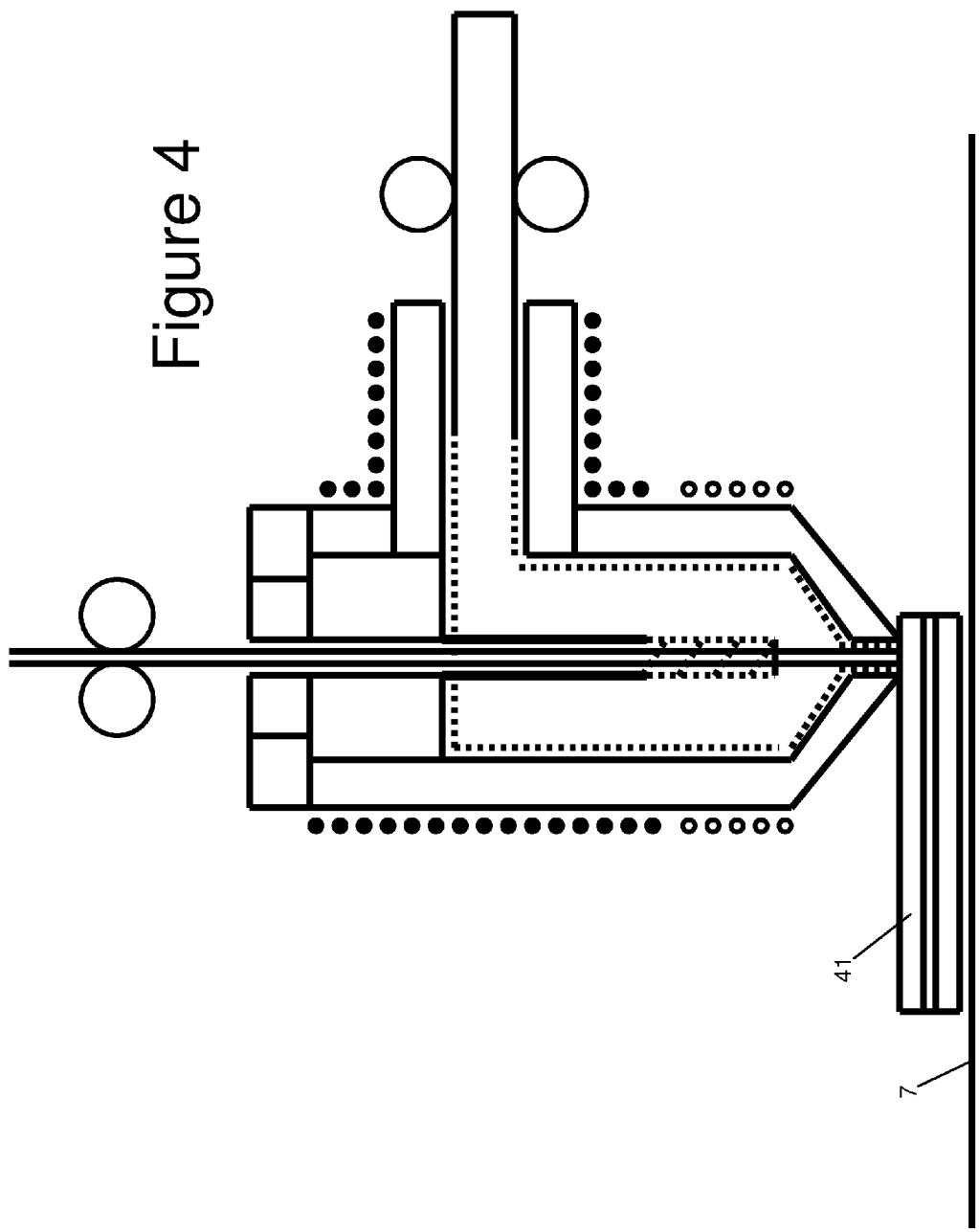
FIGS. 4-7 shows various steps in the manufacture of an object.

Apparatus for manufacturing an object by an extrusion-based additive manufacturing method is shown in FIG. 1. The apparatus comprises an extrusion head 1 having a chamber 2 with an extrusion outlet 3, a pair of motorized fibre drive rollers 4, a pair of matrix feed rollers 30, a chamber heater 5, a fibre heater 6; and a matrix heater 34. An XY drive motor 8 is arranged to cause relative movement in the XY plane between the extrusion head 1 and a heated build plate 7—in this case by moving the extrusion head 1. A Z drive motor 9 can move the build plate 7 up or down in the Z direction as the part is built. The extrusion outlet 3 is circular with a diameter D1 between 0.25 mm and 0.8 mm (and an associated area A1). The extrusion head 1 and build plate may be housed within a heated enclosure (not shown).

The extrusion head has a cylindrical body 10 with an opening at its upper end and a conical part at its lower end leading to the extrusion outlet 3. A plug 11 carried on a base 12 is received in the upper end of the body 10. The base 12 is attached to the upper rim of the cylindrical body 10. A fibre feed tube shown in FIG. 2 passes through the base 12 and the plug 11 and extends into the chamber 2. The interior of the tube provides a cylindrical fibre feed channel with an inlet 13 at its upper (proximal) end and an outlet 14 in the chamber 2 at its lower (distal) end. The fibre feed tube has a continuous upper (proximal) portion 15 which passes through the plug 11 into the chamber and is a continuous cylinder with no holes, and a discontinuous lower (distal) portion 16 fully inside the chamber which has a helical lattice structure with openings 17 distributed along its length.

Referring now to FIG. 3, the drive rollers 4 feed a reinforcement fibre 20 into the chamber 2 via the fibre feed channel at a velocity V1 m/s. The fibre 20 extends continuously through the chamber from the inlet 13 to the extrusion outlet 3, so that it is fed into the chamber by the drive rollers at the same time as it is fed out of the chamber via the extrusion outlet.

The drive rollers 4 are arranged to feed the fibre into the chamber so that it moves in and out of the chamber at the same velocity V1 relative to the chamber. The diameter of the reinforcement fibre 20 is typically of the order of 0.08 mm to 0.6 mm, with the drive rollers 4 being spaced apart as required to provide a fibre feed channel with an equivalent diameter.

The reinforcement fibre 20 is manufactured by spinning and drawing a polymer under tension to form one or more filaments with crystallites aligned with the length of the fibre. The reinforcement fibre 20 may consist of a single one of such filaments, or it may comprise a plurality of such filaments. The polymer chains and crystallites in the reinforcement fibre 20 are aligned with its length.

Suitable materials for the reinforcement fibre 20 include polyethylene (PE), High Density polyethylene (HDPE), Ultra High Density polyethylene (UHDPE), Acrylonitrile butadiene styrene (ABS), Polypropylene (PP), Polydimethyl siloxane (PDMS), Polyoxymethylene (POM), Polyethylene terephthalate (PET), Polyetheretherketone (PEEK), Polyamide (PA), Polysulphone (PS), Polyphenylene sulphide (PPS), Polyphenylsulfone (PPSF), Polytetrafluoroethylene (PTFE), or polyvinylidene fluoride (PVDF).

Dyneema (R) is one example of a suitable UHDPE fibre which can provide a yield strength greater than 2 GPa and preferably greater than 2.4 GPa, a crystallinity by weight which is greater than 80% and preferably greater than 85%, and has polymer chains with a parallel orientation greater than 90% or more preferably greater than 95%.

Returning to FIG. 1, a matrix feed tube 37 is mounted to the body 10 towards the upper end of the chamber 2. The interior of the matrix feed tube 10 provides a cylindrical matrix feed channel with an inlet 31 at its outer (distal) end and an outlet 32 in the side of the body 10 at its inner (proximal) end. A pair of motorized matrix feed rollers 30 are arranged to feed a matrix fibre 33 into the matrix feed channel as shown in FIG. 3. Alternatively the matrix material could be fed into the matrix feed channel in the form of a powder. The tube 37 carries a matrix heater 34 which melts the matrix fibre 33 in the tube 37 as shown in FIG. 3 to transform it into liquid matrix material 35 (the transformation from solid to liquid being indicated in FIG. 3 by the matrix fibre 33 being in solid lines and the liquid matrix material 35 being in dotted lines). The liquid matrix material 35 then flows into the chamber 2 through the outlet 32 at a velocity V2 m/s controlled by the rotation rate of the rollers 30.

The matrix feed tube 37 is oriented at right angles to the fibre feed tube 15,16 but may also be oriented so that the matrix is fed downwardly into the chamber an acute angle to the reinforcement fibre if desired.

The matrix material forming the matrix fibre 33 is typically the same polymer as the material forming the reinforcement fibre 20, optionally with different molecular weights. Where the molecular weights are different, then preferably the reinforcement fibre material has the higher molecular weight (for instance between 2,000,000 and 6,000,000 in the case of UHDPE). The reinforcement fibre 20 also has a higher crystallinity than the matrix fibre 33. This higher crystallinity results in a higher melting point.

Typically the fibres 20, 33 are both formed by drawing the fibre under tension from a polymer melt. However the crystallinity of the reinforcement fibre 20 is enhanced compared with the matrix fibre 33 by using a slower cooling rate, a higher drawing rate and/or a polymer with a higher molecular weight.

A controller 35 controls the heaters 5,6,34, the motorized rollers 4,30 and the drive motors 8,9 in order to manufacture an object in accordance with a Computer Aided Design (CAD) model of the object in a store 36 by following the process shown in FIGS. 3-7.

First, the fibre drive rollers 4 are driven to feed the reinforcement fibre 20 into the chamber and through the extrusion outlet 3 as shown in FIG. 3. The inwardly tapering shape of the lower part of the chamber 2 assists in guiding the fibre 20 towards the extrusion outlet 3. The drive motors 8,9 are driven to move the extrusion head into a desired position above the build plate. The matrix heater 34 is turned on to melt the matrix fibre 33 in the tube 37 and transform it into liquid matrix material 35. The matrix drive rollers 30 are then operated to feed the liquid matrix material into the chamber 2.

The liquid matrix material 35 wets the upper portion of the reinforcement fibre 20 in the fibre feed tube 16 via the lateral holes 17 in the lattice structure, as well as contacting the lower portion 20a of the reinforcement fibre 20 between the outlet 14 of the fibre feed channel and the extrusion outlet 3.

In the case where the reinforcement fibre 1 comprises a collection of filaments with inter-filament gaps, then the melted matrix material impregnates these inter-filament gaps. In the case where the reinforcement fibre 1 comprises a single filament only, then no such impregnation is necessary within the extrusion head.

The fibre feed rollers 4 and matrix feed rollers 30 are then driven simultaneously to extrude a coated fibre 40 from the extrusion outlet 3 onto the heated build plate 7, the coated fibre 40 comprising the reinforcement fibre 20 with a coating 21 of the liquid matrix material.

The diameters of the fibre 20 and extrusion outlet 3 are selected to provide an extrudate (that is, the coated fibre 40) in which the fibre 20 occupies a volume greater than 30% of the extrudate and preferably a volume in the range of 40-60% of the extrudate.

The reinforcement fibre 20 extends continuously through the chamber from the fibre inlet 13 to the extrusion outlet 3, and is relatively rigid so it can be "pushed" through the chamber by the fibre driver rollers 4, moving simultaneously in and out of the chamber at the same velocity V1 relative to the chamber. The reinforcement fibre 20 does not change in cross-section as it passes through the chamber, so the extruded coated fibre 40 has a cross-sectional area transverse to its length (defined by the area of the extrusion outlet 3) which is greater than that of the fibre 20 entering the chamber.

The matrix feed channel on the other hand has a diameter D2 of the order of 3 mm which is much greater than the diameter D1 of the extrusion outlet 3. Consequently the cross-sectional area A2 of the matrix feed channel (and the solid matrix fibre 33 being fed into it) is greater than the cross-sectional area A1 of the extrusion outlet (and the coated fibre 40 being extruded from it). The area A2 is also greater than the cross-sectional area of the matrix coating 21 of the coated fibre 40. Consequently the liquid matrix material 35 has a relatively slow velocity V2 relative to the chamber as it flows into the chamber at the inlet 32 into the chamber, but it is extruded out of the extrusion outlet 3 with the coated fibre 40 at a higher velocity V1.

The large diameter D2 of the matrix feed channel (and the solid matrix fibre 33 being fed into it) means that the solid matrix fibre 33 has sufficient buckling strength to allow it to be driven by the matrix feed rollers 30 into the matrix feed channel with sufficient force to apply a positive pressure. This positive pressure elevates the pressure of the liquid matrix material in the extrusion chamber, and can be controlled by appropriate operation of the rollers 30. The elevated pressure in the extrusion chamber provides two benefits. Firstly it assists the wetting of the reinforcement fibre 20 by the liquid matrix material. Secondly, it reduces the likelihood of defects in the coating of the extruded coated fibre 40.

The XY motor 8 is then operated to cause relative movement between the extrusion outlet and the build plate as the coated fibre 40 is extruded from the extrusion outlet, depositing a first extruded line (also known as a "road") 41 on the build plate as shown in FIG. 4. Only the matrix coating 21 is molten and the reinforcement fibre 20 remains in a rigid semi-crystalline state as it passes through the chamber and out of the extrusion outlet 3. The matrix coating of the coated fibre solidifies when it cools after it has been laid down on the build plate 7. Optionally cooling fans (not shown) may be positioned near the outlet 3 to cool the extrudate more quickly.

The pair of heaters 5,6 in the chamber are independently controllable by the controller 35. As the coated fibre is extruded, both heaters 5,6 are operated to heat the chamber and prevent the matrix material in the chamber from solidifying. However during extrusion the temperature in the chamber is kept below the melting point of the reinforcement fibre 20 so it remains rigid.

Figure 5:
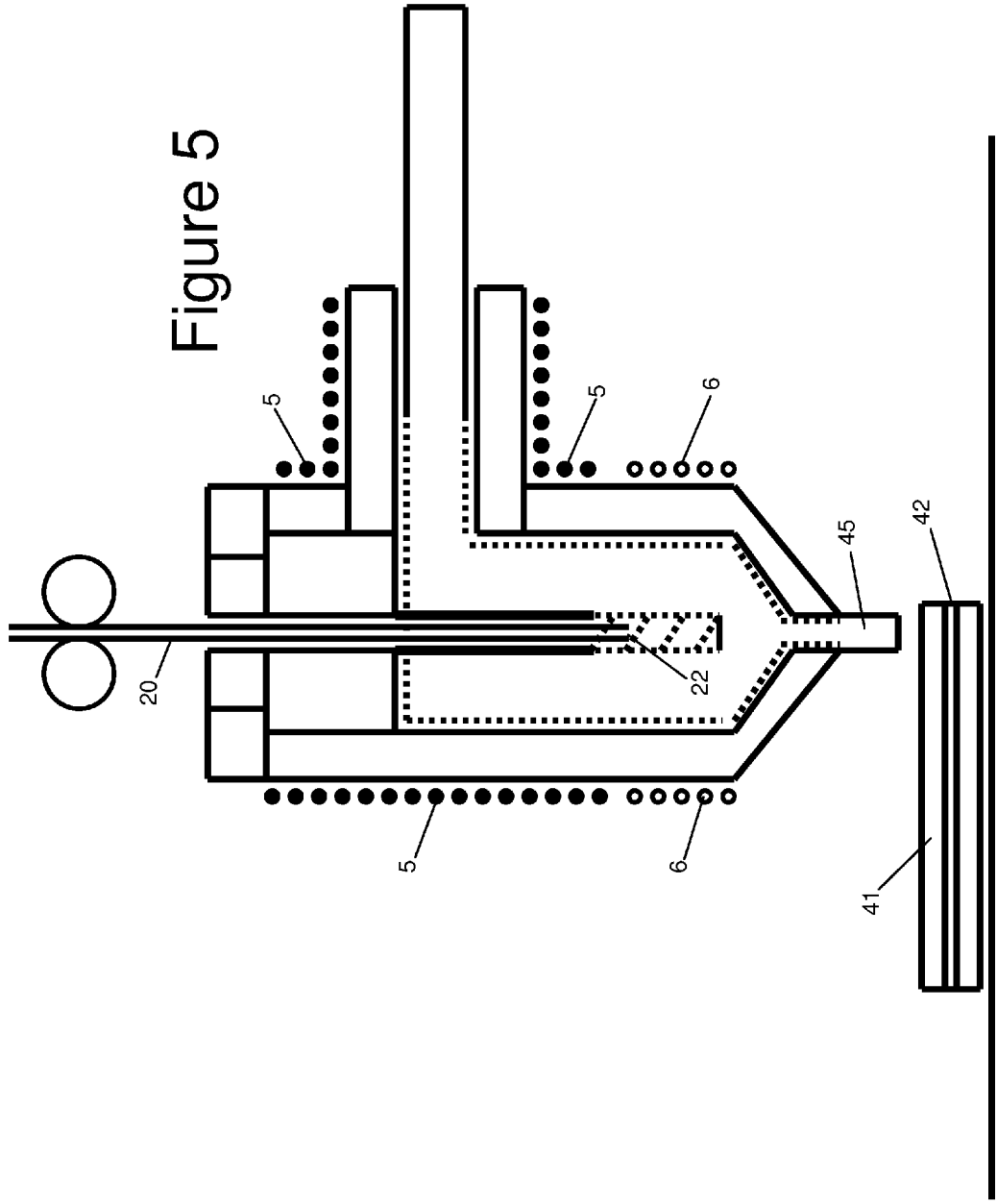

When a break is required in the extruded line 41, then the fibre heater 6 is operated to temporarily raise the temperature of the reinforcement fibre in the lower part of the extrusion head 4 above its melting point, thereby forming a break 22 in the continuous reinforcement fibre as shown in FIG. 5. At the same time the Z drive motor 9 is operated to lower the build plate 7 and effectively "cut" the coated fibre to form an end 42 of the extruded line 41.

Figure 6:
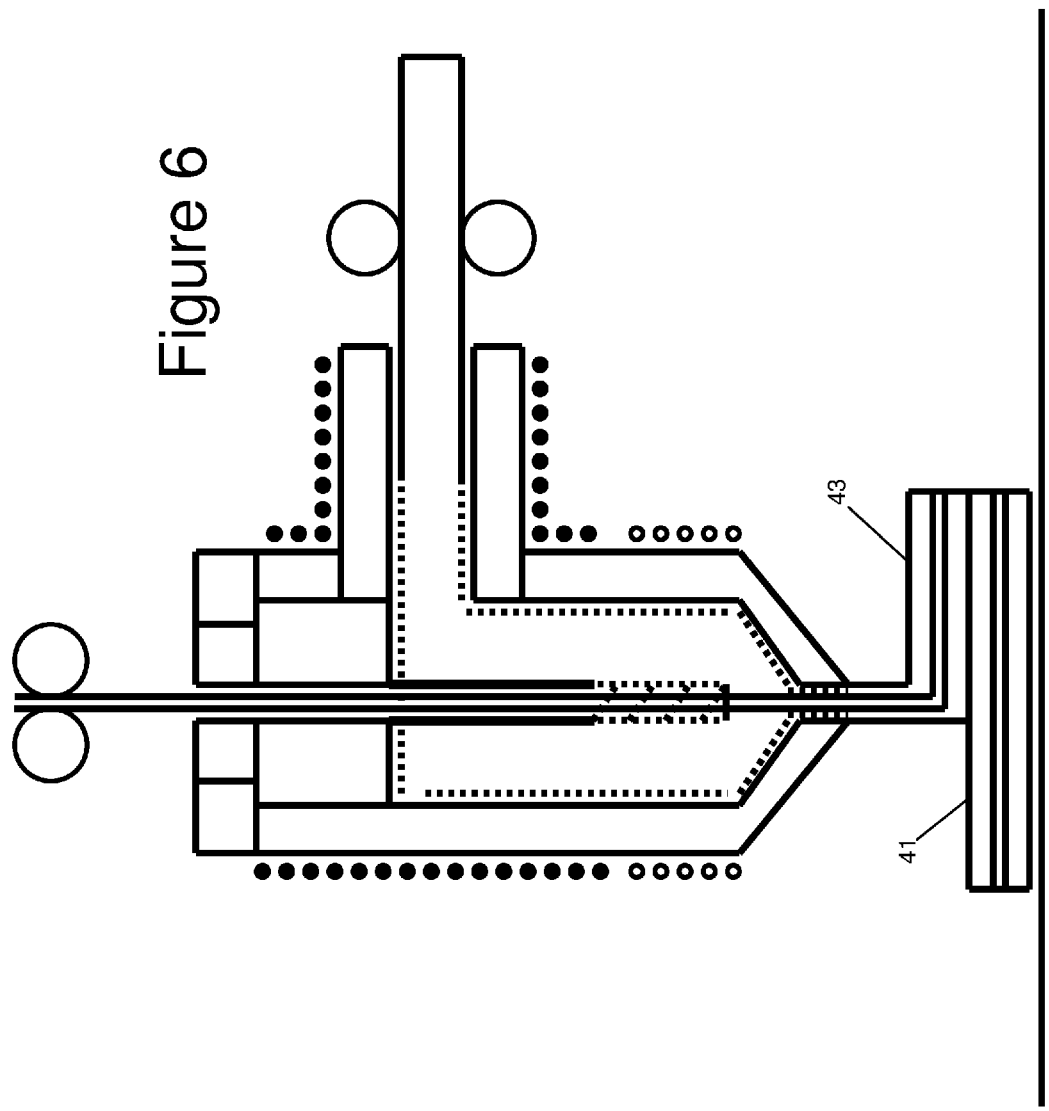

Next, the fibre heater 6 is turned down to lower the temperature in the lower part of the extrusion chamber back below the melting point of the reinforcement fibre 20 to enable a further line 43 to be extruded as shown in FIG. 6.

A small amount of amorphous material 45 is extruded out of the chamber 2 between the cut lines 41 and 43. This material 45 can deposited at the edge of the part or as a support for overhanging structures, and machined away after the whole part has been formed. The number of cuts 42 in a given part is minimised in order to minimise the quantity of such amorphous material 45.

The length of time of the heat pulse which "cuts" the coated fibre at the end of each line will depend on a number of factors, mainly the thermal mass of the extrusion head 1, but it will typically be of the order of 0.1 to 10 s.

The matrix coating of the extruded coated fibre 43 fuses with the coating of the previously extruded coated fibre 41 and solidifies after it has done so. In the case of FIG. 6 the second line 43 is deposited on top of the first line 41 with which it fuses, although it may be formed next to (and fuse with) the side of the line 41 in the same XY plane if required. The matrix material flows between and bonds together adjacent reinforcement fibres after they have been extruded, filling the gaps between the reinforcement fibres in adjacent extruded lines.

Figure 7:
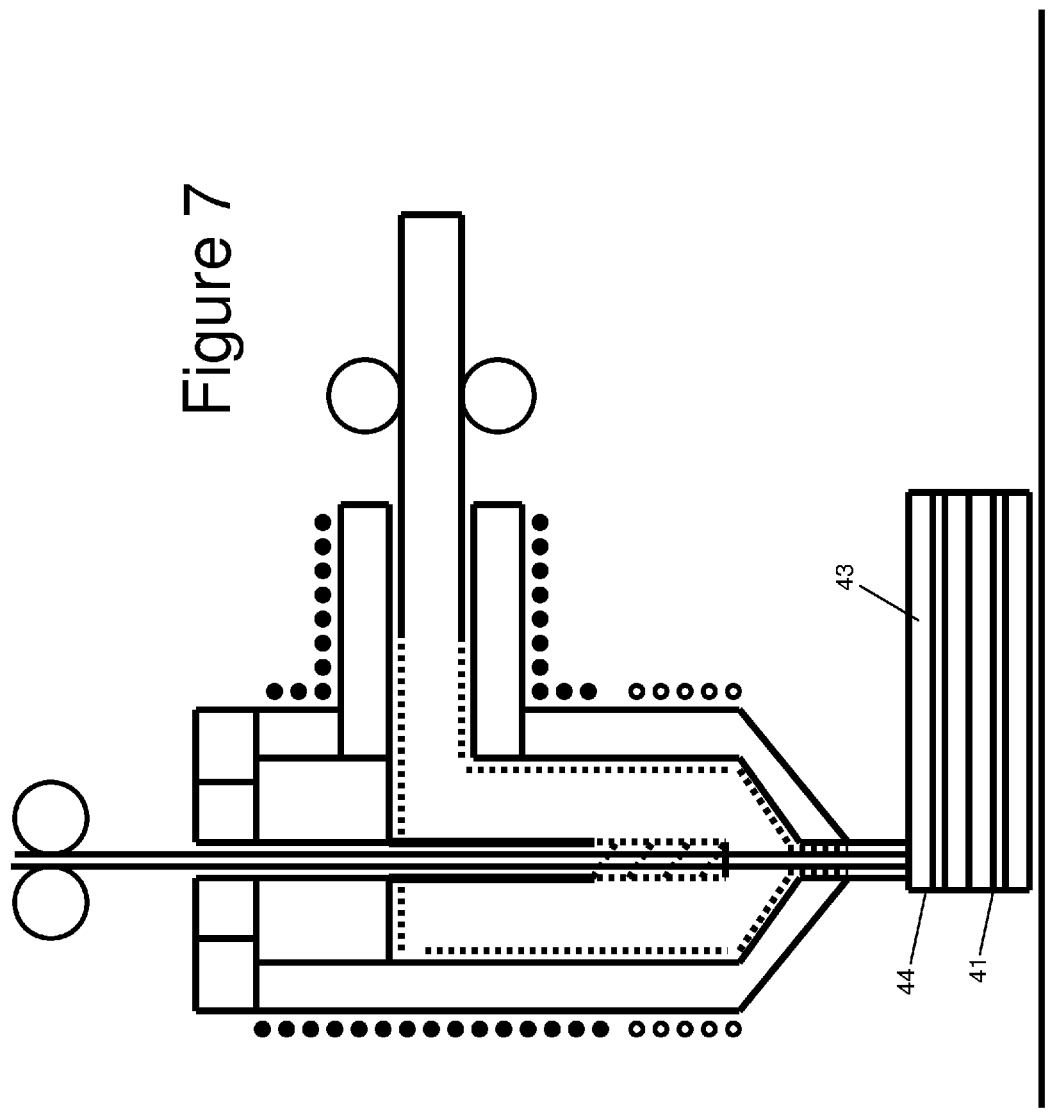

Next, the fibre heater 6 is operated again to temporarily raising the temperature of the fibre in the extrusion head above its melting point after the second line 43 has been extruded, thereby forming a break. At the same time the Z drive motor 9 is operated to lower the build plate 7 and effectively "cut" the fibre to form an end 44 of the extruded line 43 as shown in FIG. 7.

This process is then repeated a number of times as required to manufacture an object in accordance with the CAD model. An example of an object manufactured by the method of FIGS. 3-7 is shown in cross-section in FIG. 8, the section being taken transverse to the length of the extruded lines. The object comprises a stack of four layers 50-53 each containing a plurality of extruded lines. Each extruded line comprises a semi-crystalline polymeric reinforcement portion 50a-53a and a solid thermoplastic polymeric matrix portion surrounding the reinforcement portion. Each reinforcement portion runs continuously along the length of a respective one of the extruded lines and has a higher melting point and a higher crystallinity than its respective matrix portion. The matrix portions of the extruded lines are fused together to form a matrix phase 54 which extends continuously throughout the object and bonds together the reinforcement portions. Each layer has a different number of extruded lines.

Figure 8:
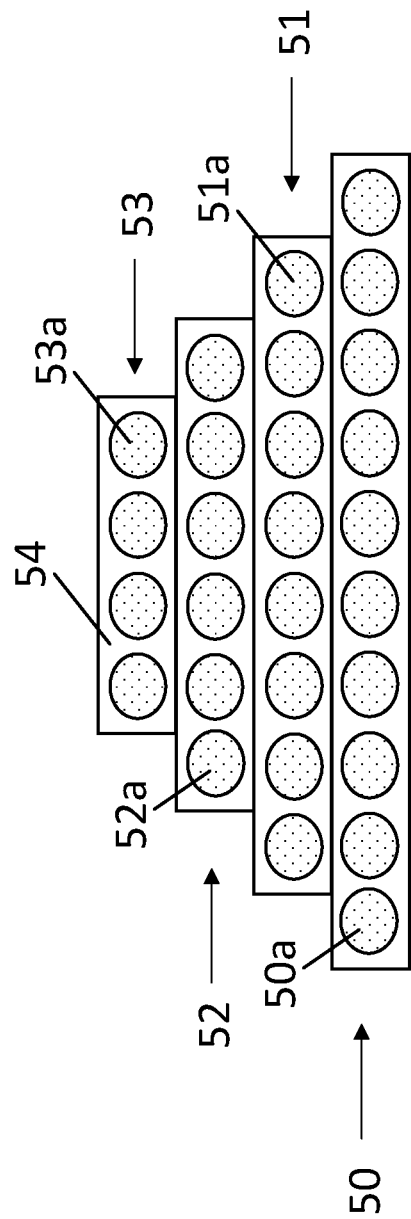
FIG. 8 is a sectional view of an object manufactured by the method of FIGS. 4-7.

In the example of FIG. 8 all lines in all layers are parallel (extending in and out of the plane of the section) but in an alternative embodiment (not shown) the lines may extend in different directions in the manner of a composite layup with some layers oriented with their lines at 0°, others at +/−45° and others at 90°, or within a given layer the fibres may extend in different directions.

Although the invention has been described above with reference to one or more preferred embodiments, it will be appreciated that various changes or modifications may be made without departing from the scope of the invention as defined in the appended claims.

The invention claimed is:

1. Apparatus for manufacturing an object by an extrusion-based additive manufacturing method, the apparatus comprising:
a chamber with one or more matrix inlets, a fibre inlet, and an extrusion outlet;
a matrix feed system arranged to feed liquid matrix material into the chamber via the matrix inlet(s);
a matrix heater for melting the matrix material before it is fed into the chamber;
a fibre feed system arranged to feed a fibre into the chamber via the fibre inlet as the liquid matrix material is fed into the chamber so that the fibre in the chamber is contacted with the liquid matrix material and a coated fibre is extruded from the extrusion outlet, the coated fibre comprising the fibre with a coating of the liquid matrix material, wherein the fibre feed system is arranged to feed the fibre into the chamber so that it moves in and out of the chamber at the same velocity relative to the chamber;
a fibre heater for temporarily raising the temperature in the chamber above the melting point of the fibre to melt the fibre in the chamber;
a build plate;
a drive system arranged to cause relative movement between the extrusion outlet and the build plate; and
a controller programmed to operate the matrix heater, the fibre heater, the feed systems and the drive system in order to manufacture an object on the build plate by extrusion-based additive manufacturing, wherein the controller is programmed to operate the fibre heater independently of the matrix heater.

2. The apparatus of claim 1 wherein the extrusion outlet has an extrusion outlet area, each matrix inlet has a matrix inlet area, and the extrusion outlet area is less than the matrix inlet area (or a sum of the matrix inlet areas).

3. The apparatus of claim 1 wherein the extrusion outlet has an extrusion outlet area, and the fibre feed system has a feed channel with a feed channel area which is less than the extrusion outlet area.

4. The apparatus of claim 3 wherein each matrix inlet has a matrix inlet area, and a difference between the extrusion outlet area and the feed channel area is less than the matrix inlet area (or a sum of the matrix inlet areas).

5. Apparatus for manufacturing an object by an extrusion-based additive manufacturing method, the apparatus comprising:
a chamber with one or more matrix inlets, a fibre inlet, and an extrusion outlet;
a matrix feed system arranged to feed liquid matrix material into the chamber via the matrix inlet(s);
a matrix heater for melting the matrix material before it is fed into the chamber;
a fibre feed system arranged to feed a fibre into the chamber via the fibre inlet as the liquid matrix material is fed into the chamber so that the fibre in the chamber is contacted with the liquid matrix material and a coated fibre is extruded from the extrusion outlet, the coated fibre comprising the fibre with a coating of the liquid matrix material, wherein the fibre feed system is arranged to feed the fibre into the chamber so that it moves in and out of the chamber at the same velocity relative to the chamber;
a build plate;
a drive system arranged to cause relative movement between the extrusion outlet and the build plate; and
a controller programmed to operate the feed systems and the drive system in order to manufacture an object on the build plate by extrusion-based additive manufacturing,
the apparatus further comprising a tube which extends from the fibre inlet into the chamber, the tube having a distal end inside the chamber which is formed with a tube outlet, and a plurality of openings distributed along its length which enable the liquid matrix material in the chamber to contact the fibre in the tube.

6. The apparatus of claim 5 further comprising a fibre heater for temporarily raising the temperature in the extrusion chamber above the melting point of the fibre to melt the fibre in the chamber.

* * * * *